Sept. 8, 1936. V. C. NORQUIST ET AL 2,053,840
TANK VEHICLE
Filed June 14, 1933 2 Sheets-Sheet 2
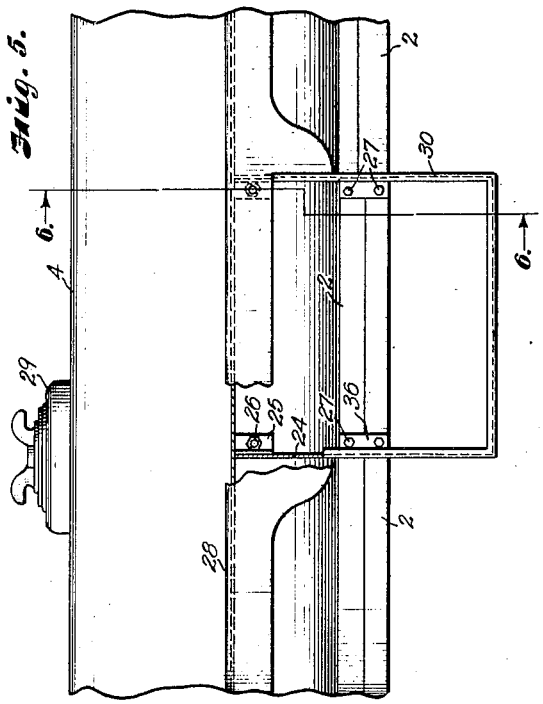
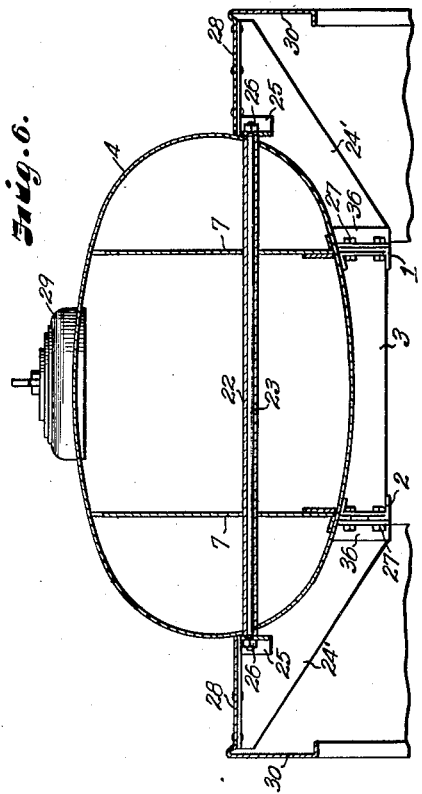
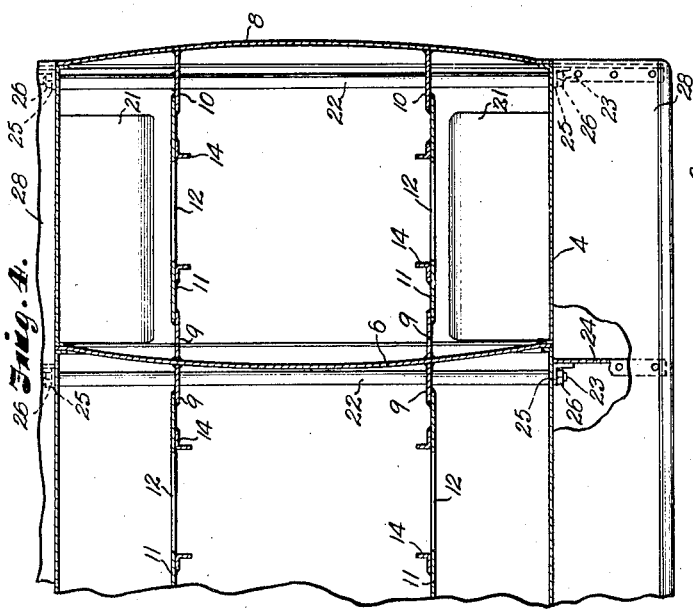
INVENTOR
Victor C. Norquist
and Ralph A. Bradley
BY
Thos. F. Penfield
ATTORNEY Patented Sept. 8, 1936

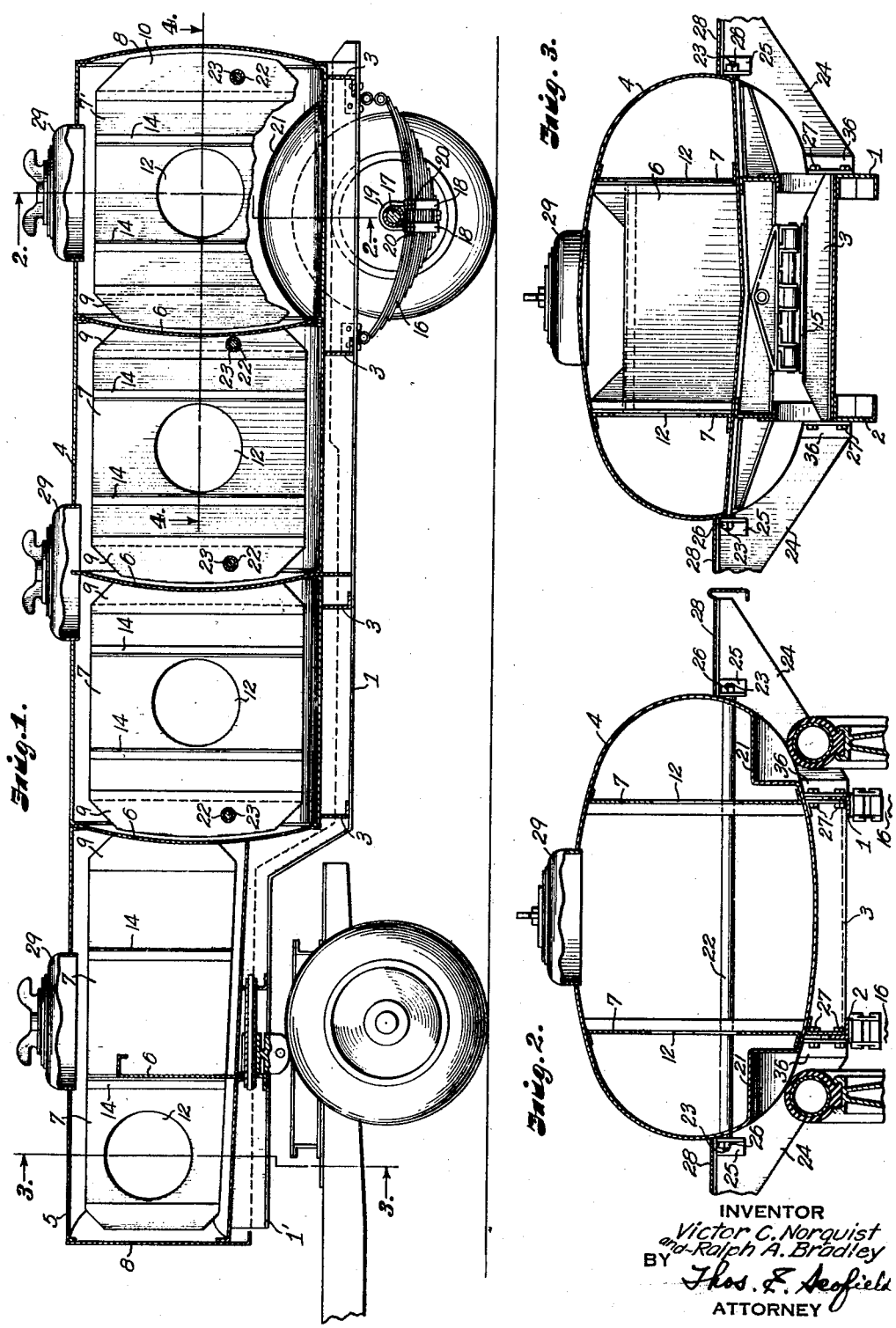

2,053,840

UNITED STATES PATENT OFFICE 2,053,840

TANK VEHICLE

Victor C. Norquist and Ralph A. Bradley, Kansas City, Mo., assignors to Butler Manufacturing Company, Kansas City, Mo., a corporation of Missouri Application June 14, 1933, Serial No. 675,766

1 Claim. (Cl. 280—5)

Our invention relates to tank vehicles and more particularly to tank vehicles of the trailer type.

Of late it has become an increasingly common practice to transport motor fuels and oils from place to place by tank vehicles of the trailer type drawn by automobile tractors. These tank vehicles supply filling stations and, in many cases, long distances are traversed by tank vehicles carrying large quantities of motor fuels and oils and/or other liquids. A large trailer tank under full load is extremely heavy and, in the trailer tanks that are now available, sagging, occasioned by the load and rough roads, takes place. This sagging springs leaks and sometimes crystallizes the skin of the tank itself, often resulting in fires and explosions. In the tank vehicles which are now available to the trade, the tank is usually placed fairly high due to the necessity of mounting it on a chassis. The placing of a tank in an elevated position raises the center of gravity and, on several occasions, trailer tanks have been known to capsize.

One object of our invention is to provide a tank construction of the type described in which the tank, per se, is rendered rigid. By this, we mean that the tank will partake of the nature of a beam so that its rigidity will be added to the rigidity of the chassis and thus prevent any danger of sagging.

Another object of our invention is to provide a trailer tank construction in which the tank will have a low center of gravity.

Another object of our invention is to provide a means for suspending a running board on either side of the tank and also for suspending a receptacle, commonly referred to as a "barrel carrier".

In the accompanying drawings, which form part of the instant specification and are to be read in conjunction therewith, and in which like reference numerals are used to indicate like parts in the various views:

Figure 1 shows a sectional elevation of a trailer tank, embodying one mode of carrying out our invention.

Figure 2 is a section taken on a line 2—2 of Figure 1.

Figure 3 is a sectional view taken on the line 3—3 of Figure 1.

Figure 4 is a fragmentary sectional view taken on the line 4—4 of Figure 1.

Figure 5 is a detailed side elevation, showing the barrel carrier.

Figure 6 is a sectional view taken on the line 6—6 of Figure 5.

Figure 7 is a detail view showing the method of mounting the axle on the springs.

In general, our invention contemplates provision of a tank equipped with a plurality of spaced transverse apparatus and the provision of longitudinal webs extending between partitions, or between a partition and the tank end wall. The partition members are welded to the tank skin or secured thereto in any suitable manner. The longitudinal webs are welded to the partitions along their vertical edges. The horizontal edges of the webs are welded to the skin of the tank itself. In practice, we have found that a pair of webs will give a more rigid construction.

In order to obtain a low center of gravity, we reduce the forward end of the tank in the region of the fifth wheel by which this end of the tank is secured to the towing vehicle. At the rear end of the tank we mount the axle of the ground wheels above the springs by means of a suspension clamp. At the same time, the chassis is lowered considerably. To accommodate for the lowered chassis, we provide the tank itself with re-entrant portions in the vicinity of the wheels.

To provide a means for suspending running boards on either side of the tank and to support a barrel carrier in which barrels of other liquids are carried, we provide a plurality of spaced tubular members extending transversely through the tank and positioned in these tubular members are tension rods, to which are secured webs which in turn support the running board and barrel carrier.

More particularly referring now to the drawings, the trailer chassis is formed of a pair of longitudinal beams 1 and 2. It will be noted that the portion 1' of the beam 1 and the portion 2' of the beam 2 are in a different plane from the after portions of the beams, the two portions of the beams being connected by inclined portions. This can be readily seen by reference to Figure 1. The beams 1 and 2 are held in spaced relation by cross beams 3. Cross beams 3 also form a saddle for the reception of a tank 4. This tank may be made in any suitable manner and is provided at its forward end with a reduced portion 5 to conform with the offset of the longitudinal beams 1 and 2 of the chassis. At spaced intervals within the tank, we provide transverse partitions 6. Secured between partitions 6 we provide longitudinal web members 7. It will be noted that web members 7' at the tank end extend from partitions to the end walls 8 of the tank. The web members 7 are welded at intervals. In order to provide ease of installation and to allow of slight differences in the spacing of the partitions, I form the web member 7 of three parts. This can be readily seen by referring to Figure 4. It will be noted that each web member 7 comprises a pair of members 9 and 10 which are welded to the transverse partitions. A central member 11 is then welded to the members 9 and 10 of the web member 7 by means of a lap weld. It will be readily appreciated that the spacing between partitions need only be slightly wider than member 11 of the web member 7, to permit the employment of these partitions. The partitions 7 are provided with lightening holes 12. If desired, partitions 6 may be also provided with lightening holes not shown. A coaming 14 may be provided around the lightening holes 12, as can readily be seen by reference to Figure 4. In practice, we find it desirable to use a pair of longitudinal web members 7. With this construction, a very rigid tank results. It is obvious that a single web member or any suitable number thereof may be employed without departing from the spirit of our invention.

The reduced portion of the tank is supported by a fifth wheel 15, as can readily be seen by reference to Figure 3. The rear portion of the tank is supported in a novel manner. A pair of springs 16 is secured to the chassis in any suitable manner. An axle 17 is clamped to the top of the springs in the manner shown in Figure 7. A pair of U-members 18 surround the springs 16. A pair of U-members 19, disposed at right angles to U-members 18 pass around the axle 17 and are secured to each other by means of bolts 20, as can readily be seen by reference to Figures 1 and 7. It will be obvious that, in this manner, the tank can be mounted considerably lower, inasmuch as the springs 16 for a heavy tank vehicle will have considerable thickness. On a tank vehicle which we have built in accordance with our invention, the thickness of the springs was 6½". The axle was 4" in diameter so that the total saving in height by this method of mounting was 8½". This was obviously arrived at by taking one half the diameter of the axle and adding it to the thickness of the spring. It will also be noted that the axle is mounted unusually close to the chassis. In a tank which we built in accordance with one mode of carrying out our invention, the free arch of the axle was 9½", which is sufficient for any load which might be encountered. In order to permit of this mounting, we have provided the tank vehicle with re-entrant portions 21 as can readily be seen by reference to Figures 1 and 2. These re-entrant portions are directly over the wheels and allow for any twist occasioned by the flexing of the skin.

At suitable places, we provided the tank with transverse tubular members 22, the ends of which may be welded to the skin or may project slightly beyond the same and be welded to the tank skin at the intersection. Positioned in the tubular members, we provide tension members 23. These tension members may be rods, cables, or any suitable type of tension taking construction. We have found that rods or pipes will serve the purpose admirably. The ends of the tension members 23 extend slightly beyond the tubular members and are provided with threaded ends. Secured to the tension members are webs or brackets 24. These webs may be built up by welding angles 25 and 36 to the web plate, or may be made in any other suitable manner. Angles 25 are provided with holes which fit over the ends of the rods 23 and are secured thereto by means of bolts 26. The lower ends of the webs 24 are secured to the longitudinal members 1 and 2. As can be readily seen by reference to Figures 2 and 3, angles 26 are provided with openings adapted to receive bolts 27. Extending longitudinally of the tank on either side thereof is a running board 28 which is supported by the webs 24. This running board enables the tank attendant to operate the manhole covers 29 and to move along the tank on either side. Also suspended from any suitable pair of web members, we provide a barrel carrier. A barrel carrier is a receptacle which is adapted to receive a number of barrels which may be filled with lubricating oil in event the tank be used for gasoline or any other liquid not carried by the large tank. Empty barrels may also be carried in the barrel carrier if desired to be filled from the tank.

Reference may now be had to Figure 6 which shows a pair of webs 24' supporting barrel carriers 30. It is believed that the construction shown in Figures 5 and 6 will render the manner of mounting the barrel carriers obvious.

It will be observed that we have accomplished the objects of our invention. We have provided a tank construction which is rigid and which will not sag under the very heaviest of loads. We have provided a trailer tank construction having an extremely low center of gravity. We have provided a novel and strong manner of mounting running boards and barrel carriers.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

In a trailer tank vehicle, a tank, ground wheels, means for supporting the after end of said tank on said ground wheels, a fifth wheel, means for supporting the forward end of said tank on said fifth wheel, transverse partition members in said tank, longitudinally disposed webs positioned between said partitions, said web members having vertical edges, upper horizontal edges and lower horizontal edges, said vertical edges being secured to said partition members, and said upper and lower horizontal edges being secured to the inner-surface of said tank, the construction being such that said web members and partition members render said tank sufficiently rigid to constitute it a beam whereby it may be suspended from the ground wheels and the fifth wheel without the use of a frame.

VICTOR C. NORQUIST.
RALPH A. BRADLEY.